Sept. 4, 1928.
J. H. FLETCHER
1,682,899
RESILIENT WHEEL
Filed Nov. 16, 1927
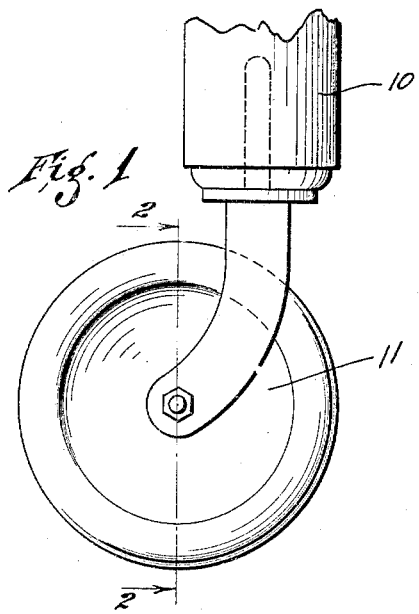
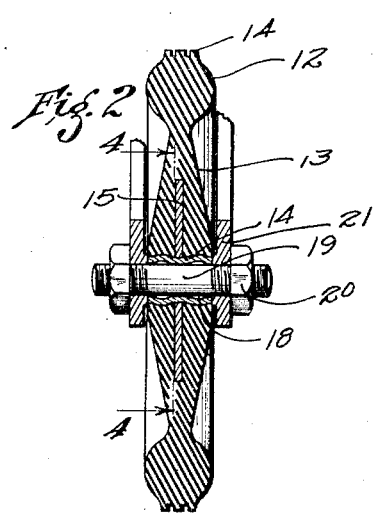
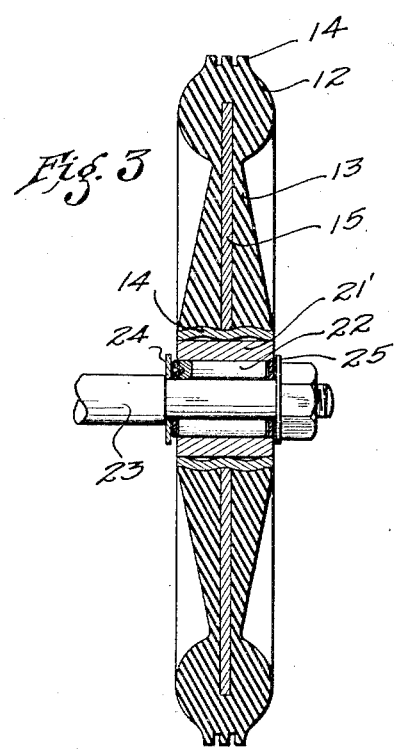
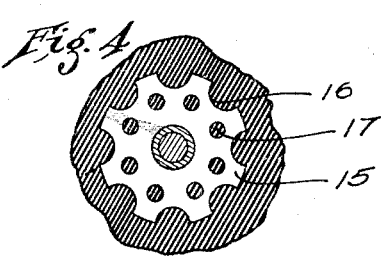
INVENTOR
Joseph H. Fletcher
By Townsend, Loftis & Abbett
ATTORNEYS Patented Sept. 4, 1928.

1,682,899

UNITED STATES PATENT OFFICE.

JOSEPH H. FLETCHER, OF LOS ANGELES, CALIFORNIA.

RESILIENT WHEEL.

Application filed November 16, 1927. Serial No. 233,653.

This invention relates to the running gear of vehicles and particularly pertains to a resilient wheel forming a part thereof.

In the construction of many vehicles it is desirable to provide some device of resilient nature which will insure that shock delivered to the tires of the running gear will be absorbed, to a desirable degree, before reaching the frame of the vehicle. Structures designed to produce this result have been built in the past and, for the most part, have embodied the use of resilient tires carried upon the running gear wheels, resilient members interposed between the hubs of the wheels and the rims, or spring suspension, interposed between the vehicle axles and the frame. It is the object of the present invention to provide a wheel structure which possesses inherent resiliency throughout, thus insuring that the shock delivered to the tire of the wheel will be absorbed to a great extent within the wheel structure without being transmitted to the axle, and from thence through the frame suspension to the body of the vehicle. It is a further object of this invention to provide a structure of the above character which eliminates the use of a multiplicity of parts liable to break or get out of order, and which wheel structure may be simply made at a very low manufacturing cost.

The present invention contemplates the formation of a wheel and resilient tire in an integral structure. Said wheel and tire being moulded from rubber, and embodying stiffening means therein which do not impair the resilient action of the wheel, and which stiffening means carry bearing supports for the axle or its bearings.

The invention is illustrated by way of example in the accompanying drawings in which;

Figure 1 is a fragmentary view in side elevation, showing one application of the present invention to a caster structure.

Fig. 2 is an enlarged transverse section taken centrally of the wheel, as seen on line 2—2 of Fig. 1, and as disclosing one form of axle bearing and the stiffening member for the wheel.

Fig. 3 is an enlarged transverse section through a wheel of larger diameter than that shown in Fig. 2 and designed for supporting heavier loads, said view showing the means of mounting a roller bearing cage within the hub of the wheel, and further showing a different arrangement of the stiffening plate.

Fig. 4 is an enlarged fragmentary section as seen on the line 4—4 of Fig. 2, and as showing the stiffening plate imbedded within the web of the wheel.

Referring more particularly to the drawing, 10, indicates a portion of a structure beneath which a wheel, 11, is disposed. This structure is here indicated as the post of a bed, or other article of furniture. It is, however, to be understood without further illustration, that wheels of the character here disclosed may be used in casters for furniture or the like, hospital equipment, trucks, children's vehicles, and, in fact, suitably designed wheels of proper dimensions may be adapted to larger vehicles such as automobiles. In any event, the wheel, 11, comprises a tire section, 12, and a web section, 13, integrally moulded. As shown in Figs. 2 and 3, the tire may be of circular cross section having an additional tread portion, 14, around its circumferential edge. The web is preferably solid to form a wheel of the usual disk wheel type of design. This web has a central thickness substantially equal to the length of a bearing bushing, 14, imbedded centrally thereof, while at its outer edge and at the point of juncture with the tire it is relatively narrow in thickness, thus resiliency is not only obtained due to pressure upon the periphery of the tire to disform the tire mass, but also may be transmitted to the web where further resiliency with resultant absorption of shock will be obtained.

In the construction of this wheel it may be desirable for certain purposes to mould the wheel from high grade gum rubber, but for all practical and commercial purposes it has been found that the wheels may be satisfactorily made when moulded from scrap rubber which has been obtained by reclaiming the rubber of used automobile tires, even though the fiber in the mass has not been removed. It will thus be apparent that wheels of this construction may be very cheaply manufactured, both as to labor and the cost of material and also due to the fact that the wheel may be formed in a mould by a single operation.

Imbedded within the web of the wheel and preferably in a transverse plane centrally thereof, is a stiffening plate, 15. This plate is in the form of a disk, the edges of which, as indicated in Fig. 4, are previously scolloped, as indicated at 16, so that the disk will not work free within the mass of rubber. It is also desirable to perforate the disk at points as indicated at 17. In this manner the mass of material will be moulded directly through the openings, and will tend to bind the entire webbed structure together. In the form of the invention shown in Fig. 3 it will be noted that the disk, 15, is of relatively larger diameter than the web, 13, and that the marginal portion of the disk terminates within the tire, 12. This variation in diameter has been found necessary in making a wheel of relatively large diameter, so that the weight imposed upon the wheel will not objectionably disform the wheel at the point of juncture, between the web and the tire, as might be the case in structures like shown in Fig. 2.

Referring to Fig. 2 of the drawing, it will be seen that axle bushing, 14, is circumferentially corrugated upon opposite sides of the transverse center thereof. These corrugations have been produced after the stiffening plate, 15, has been positioned upon the bushing. The bushings are then subjected to pressure, which tends to upset them at opposite sides of the stiffening plate, 15, and causes them to bulge outwardly at points substantially midway between the position of the stiffening plate, 15, and the outer ends of the bushing, thus annular oil pockets, 18, are formed which tend to hold a supply of oil to insure that the axle, 19, will be sufficiently lubricated. This axle may be of any desired construction, although it is here shown as being in the form of a bolt threaded at its opposite ends and receiving nuts, 20, which secure it in position with relation to the bearing arms, 21.

In the form of the invention shown in Fig. 3, an outer roller bearing ring, 21, is pressed into the bushing, 14, and circumscribes a set of bearing rollers, 22, which are fitted around an axle, 23, and are held in position by thrust washers 24 and 25. It will be readily recognized that any desired bearing structure might be provided, and that if desired, the wheel might be mounted in fixed relation to a live axle, so that propulsion power would be imparted thereto, since the stiffening plate, 15, is properly keyed to the axle and is imbedded within the mass of the wheel web.

In the manufacture of the wheel, the bushing, 14, is inserted through an opening in the center of the stiffening plate, 15, and may thereafter be upset to corrugate the bushing and to centrally fix the stiffening web. It may be found practicable to eliminate the corrugation operation and to cause the opposite halves of the moulding die to strike the ends of the bushing at the conclusion of the moulding operation, and to thus upset the bushing within the mould. In any event, a mass of rubber is placed within the mould around the stiffening disk and thereafter subjected to pressure to cause a wheel of the construction here disclosed to be formed.

It will thus be seen that by the construction here disclosed it is possible to rapidly and economically make resilient wheels for various purposes. Said wheels being capable of supporting a considerable weight and acting under shock to absorb the major portion of the shock delivered thereto, and it will be further seen that due to the integral manner in which the wheel web and its tire have been shaped and formed with relation to each other, lateral and radial shock may be delivered to the wheel, and will be absorbed within the structure.

While I have shown the preferred form of my invention, as now known to me, it will be understood that various changes may be made in the combination, construction and arrangement of parts by those skilled in the art without departing from the spirit of the invention as claimed.

Having thus described my invention, what I claim and desire to secure by Letters Patent is:—

1. A wheel structure comprising a hub bushing, a stiffening plate circumscribing said bushing and carried thereby, said plate being disposed in a plane transversely of the longitudinal center of the bushing, and a wheel structure formed of a mass of resilient material enveloping said stiffening plate and being moulded thereover.

2. In a wheel structure an axle bearing comprising a tubular member circumferentially corrugated at intervals longitudinally of its length; the undulations of said corrugations acting as oil pockets, and a wheel structure moulded of rubber comprising a disk shaped wheel web and a circumscribing tire formed integrally therewith.

3. In a wheel structure an axle bearing comprising a tubular member circumferentially corrugated at intervals longitudinally of its length, the undulations of said corrugations acting as oil pockets, and a wheel structure comprising a disk shaped wheel web and a circumscribing tire formed integrally therewith, both of which are moulded from a mass of rubber and means imbedded within the structure for stiffening the same.

JOSEPH H. FLETCHER.